(12) United States Patent
Buse et al.

(10) Patent No.: US 7,322,565 B2
(45) Date of Patent: Jan. 29, 2008

(54) STIRRING DEVICE AND PROCESS FOR CARRYING OUT A GAS-LIQUID REACTION

(75) Inventors: Rainer Buse, Köln (DE); Berthold Keggenhoff, Krefeld (DE); Jürgen Münnig, Kaarst (DE); Friedhelm Steffens, Leverkusen (DE); Joachim Ritter, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 179 days.

(21) Appl. No.: 11/199,697

(22) Filed: Aug. 9, 2005

(65) Prior Publication Data

US 2006/0038306 A1    Feb. 23, 2006

(30) Foreign Application Priority Data

Aug. 18, 2004    (DE) .................... 10 2004 039 960

(51) Int. Cl.
*B01F 3/04*    (2006.01)
(52) U.S. Cl. .............................. 261/87; 261/91; 261/93
(58) Field of Classification Search ................. 261/84, 261/85, 87, 88, 91, 93
See application file for complete search history.

(56) References Cited

U.S. PATENT DOCUMENTS

| | | | | |
|---|---|---|---|---|
| 1,413,724 A | * | 4/1922 | Groch .......................... 261/87 |
| 2,996,287 A | * | 8/1961 | Audran ....................... 366/265 |
| 3,490,996 A | * | 1/1970 | Kelly, Jr. .................... 202/234 |
| 3,761,521 A | | 9/1973 | Alheritiere et al. ......... 260/580 |
| 3,782,702 A | * | 1/1974 | King .......................... 261/87 |
| 3,984,001 A | | 10/1976 | Nagano et al. ................ 209/3 |
| 4,193,949 A | * | 3/1980 | Naito .......................... 261/87 |
| 4,249,828 A | | 2/1981 | Condolios ................... 366/102 |
| 4,343,636 A | | 8/1982 | Bhatti .............................. 65/1 |
| 5,013,490 A | * | 5/1991 | Tanimoto et al. ............. 261/87 |
| 5,198,156 A | * | 3/1993 | Middleton et al. ............ 261/87 |
| 5,318,360 A | * | 6/1994 | Langer et al. ............... 366/317 |
| 5,779,995 A | | 7/1998 | Witt et al. .................. 422/215 |
| 5,795,504 A | * | 8/1998 | Berchotteau ................. 261/30 |

(Continued)

FOREIGN PATENT DOCUMENTS

GB    1 464 784    2/1977

(Continued)

OTHER PUBLICATIONS

Zlokarnik M et al: "Rohr- und Scheibenrührer—zwei leistungsfähige Rührer zur Flüssigkeitsbega-sung" CHEMIE-ING-TECHN., Bd. 39, Nr. 20, 1967, Seiten 1163-1168 XP009056521.

*Primary Examiner*—Scott Bushey
(74) *Attorney, Agent, or Firm*—Lyndanne M. Whalen; John E. Mrozinski, Jr.

(57) ABSTRACT

The invention describes a stirring device made from a gassing stirrer and a liquid mixer or two liquid mixers, which are arranged on a shaft and each have a feed and at least one exit opening, wherein the exit openings of the gassing stirrer and of the liquid mixer or the liquid mixers are at a distance from one another, the ratio, a/d, of the distance, a, between the exit openings to the diameter, d, of the gassing stirrer or liquid mixer being 0.02 to 0.5 and the ratio, b/d, of the distance, b, between the outer edges to the diameter, d, of the gassing stirrer or liquid mixer being 0.01 to 0.4.

18 Claims, 3 Drawing Sheets

U.S. PATENT DOCUMENTS 6,126,150 A * 10/2000 Van Dyk ............... 261/87
6,280,078 B1 * 8/2001 Lewis ................. 366/316
6,439,756 B1 * 8/2002 Forschner et al. ...... 366/102
6,712,980 B1 * 3/2004 Ahlstrom .............. 210/758

FOREIGN PATENT DOCUMENTS

WO          03/28644 A2     4/2003

* cited by examiner

STIRRING DEVICE AND PROCESS FOR CARRYING OUT A GAS-LIQUID REACTION

FIELD OF THE INVENTION

The invention relates to a stirring device made from a gassing stirrer and a liquid mixer or from two liquid mixers, and a process for carrying out gas-liquid reactions with the inventive stirring device.

BACKGROUND OF THE INVENTION

Gas-liquid reactions occur frequently in chemical process technology. Examples are oxidations, hydrogenations, chlorinations or biochemical reactions with consumption of oxygen. These reactions are in many cases also carried out with the addition of a solid component, e.g. a catalyst.

There are numerous proposals for reactors for carrying out such reactions, which often envisage a gassing stirrer for mixing in the gaseous reactants. Thus, for example, M. Zlokarnik, *Rührtechnik*, p. 174 et seq., Springer Verlag, 1999 or *EKATO Handbook of Mixing Technology*, p. HY.1 et seq., Ekato Rühr-und Mischtechnik GmbH, Schopfheim, Germany describe gassing stirrers.

EP 784 505 A describes a slurry phase reactor for exothermic reactions, in particular for the hydrogenation of aromatic nitro compounds, having a stirrer for circulating the reaction mixture and an additional gassing stirrer. The reaction partners are led into the reactor via a metering tube in the immediate vicinity of the stirrer which is employed for circulating the reaction mixture. Depending on the conveying direction and conveying characteristics, the reactant is deflected in the radial or axial direction and thereby mixed into the volume stream sucked in by the stirrer.

U.S. Pat. No. 3,761,521 discloses a process and a device for carrying out continuous reactions, e.g. the hydrogenation of aromatic nitro compounds. In this, a reaction mixture is formed by mixing a gaseous phase and a second solid or liquid phase in a liquid medium. During the mixing, the gas is dispersed rapidly in the liquid phase. Some of the liquid phase overflows continuously from the stirred reaction space into a separator for the catalyst. The gas and the liquid phase are fed to the stirrer via tubes from the top, the stirrer sucking in further gas via a hollow shaft.

M. Assirelli, W. Bujalski, A. W. Nienow, A. Eaglesham, "Intensifying Micromixing with a Rushton Turbine", *5th International Symposium on Mixing in Industrial Processes*, Sevilla, Spain, 2004 describes a reaction in a stirred reactor in which one of the reactants of the reaction mixture is fed in close to the stirrer. The feeding in of the one reactant takes place here via a hollow shaft, from which three curved tubes branch off. The tubes end at some distance from the edges of the stirrer blades in the vertical and horizontal direction. The radially conveying disc stirrer described has six blades. Moreover, the use of a gassing stirrer is not described herein.

In gas-liquid reactions, gassing stirrers which are connected to the gas space above the level of the liquid via a hollow shaft are also employed to intensify the gassing. The gassing stirrers are particularly suitable for redispersing the not yet completely reacted gaseous reaction partner. M. Zlokarnik, H. Judat, "Rohr-und Scheibenrührer-Zwei leistungsfähige Rührer zur Flüssigkeitsbegasung", *Chemie-Ingenieur-Technik* 39, volume 20, p. 1163-1168, 1967 describes a stirrer which is constructed as a four-armed tubular stirrer. Two opposite arms suck in gas and the other two arms liquid. The conveying capacity of the liquid stirrer drops sharply when the gas trail reaches and envelops the next arm.

BE 869 961 A describes a stirrer in the form of a disc, wherein the stirrer is equipped with various nozzles for gas and liquid. The gas or liquid is introduced under pressure via the nozzles, so that in the event of failure of the stirrer motor settling of the suspension can be avoided for a certain period of time. This device is not suitable for independent conveying or for metering in during normal stirrer operation.

The difficulty in reactors for gas-liquid reactions, in addition to a good distribution of the gas phase, lies in mixing the liquid reactants into the reaction mixture as uniformly as possibly, since any local excess concentration can lead to the formation of by-products, and in the case of catalysis by solids also to deactivation of the catalyst due to a local overload. Optimizing the mixing in both of the gas and of the liquid without the gas and liquid interfering with one another is a further object. For example, in the case of the four-armed tubular stirrer, which is known e.g. from M. Zlokarnik, H. Judat, "Rohr- und Scheibenrührer-Zwei leistungsfähige Rührer zur Flüssigkeitsbegasung", *Chemie-Ingenieur-Technik* 39, volume 20, p. 1163-1168, 1967, a drop in the conveying capacity of the liquid stirrer occurs due to the formation of the gas trail. This drop in capacity also has an adverse effect on the mixing.

SUMMARY OF THE INVENTION

The present invention, accordingly, provides a stirring device which allows a uniform distribution of liquid, and optionally, gaseous reactants into the reaction mixture, avoiding the disadvantages inherent in the art.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
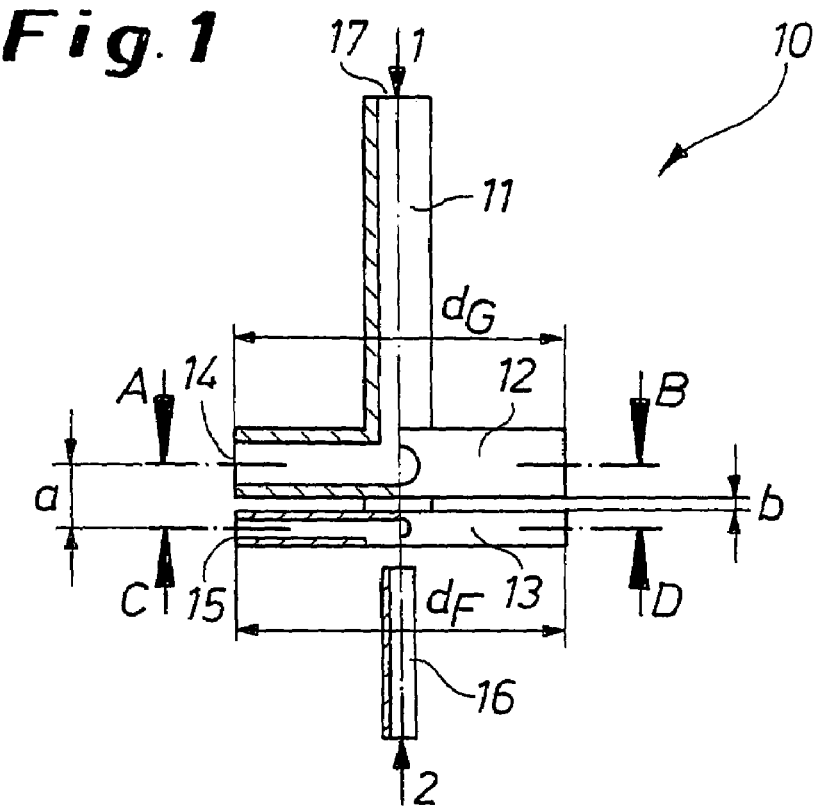
FIG. 1 shows a first embodiment of the stirring device according to the invention.

The present invention will now be described for purposes of illustration and not limitation. Except in the operating examples, or where otherwise indicated, all numbers expressing quantities, percentages and so forth in the specification are to be understood as being modified in all instances by the term "about."

The present invention provides a stirring device made from a gassing stirrer and a liquid mixer or from two liquid mixers, which are arranged on a shaft and each have a feed and at least one exit opening, wherein the exit openings of the gassing stirrer and of the liquid mixer or the liquid mixers are at a distance from one another, the ratio, a/d, of the distance, a, between the exit openings to the diameter, d, of the gassing stirrer or liquid mixer preferably being 0.02 to 0.5, more preferably 0.05 to 0.3, and the ratio, b/d, of the distance, b, between the outer edges to the diameter, d, of the gassing stirrer or liquid mixer preferably being 0.01 to 0.4, more preferably 0.02 to 0.2.

The stirring device according to the invention contains at least two stirrers. In a first embodiment, these are a gassing stirrer and a liquid mixer, and in a second embodiment, two liquid mixers. A stirring device having more than two stirrers with any desired combination of liquid mixers and/or gassing stirrers is also possible. Gassing stirrers are known to those skilled in the art. In principle, any desired gassing stirrer can be employed for the stirring device according to the invention. Preferably, a tubular stirrer or turbine stirrer is employed. A liquid mixer in the context of the present invention is understood as meaning a mixer or stirrer which, analogously to a gassing stirrer, serves to mix in a liquid reactant. The liquid mixer has at least one entry opening, via which a liquid reactant is fed in. The stirrers of the liquid mixer have exit openings, from which the liquid reactant exits. The liquid mixer can accordingly be, for example, a hollow stirrer, in particular a tubular stirrer, or a pump impeller. The types of gassing stirrers and liquid mixers can be combined as desired, e.g. tubular stirrer as the gassing stirrer and liquid mixer or turbine stirrer as the gassing stirrer and pump impeller as the liquid mixer or tubular stirrer and turbine stirrer or impeller. Axially conveying stirring organs, such as angled blade stirrers, are particularly preferred.

The gassing stirrer and the liquid mixer or the two liquid mixers are arranged on a shaft. The two stirrers or mixers are accordingly arranged one above the other, it being possible for the gassing stirrer and the liquid mixer to be mounted one above the other in any desired sequence.

The gassing stirrer and the liquid mixer or each of the two liquid mixers have a feed for the reactants to the stirrer or mixer. The shaft, for example, can serve as the feed in that it is constructed as a hollow shaft. A hollow shaft can serve as a feed for a gaseous or liquid reactant. If the stirring device according to the invention has two liquid mixers, the hollow shaft can also be employed as the feed for two liquid reactants in that the hollow shaft is constructed, for example, from two concentrically arranged tubes. Alternatively, feeding in of a first reactant from the top through the shaft and of a second reactant from the bottom through the shaft is possible. For example, if only one of the reactants is fed in via the hollow shaft, a second liquid or gaseous reactant can also be fed to the gassing stirrer or liquid mixer via an additional tube line. This can be effected, for example, by the gassing stirrer or the liquid mixer being equipped with a suction opening and a tube line being arranged in the region of the suction opening as the feed for a reactant. The tube line can be either connected to the suction opening or at a distance from this.

In a first embodiment of the stirring device according to the invention, a gassing stirrer is arranged above a liquid mixer on a shaft. The shaft is constructed as a hollow shaft and is envisaged as a feed for the gassing stirrer. The liquid mixer has a suction opening which is preferably located centrally on its under-side, i.e. on the side facing away from the gassing stirrer. A tube line is provided as a feed for the liquid mixer, one opening of the tube line, e.g. an open end, being arranged in the region of the suction opening. In the region of the suction opening in this context means that the distance, $a_A$, between the suction opening and the opening of the tube line to the diameter, $d_A$, of the suction opening is in a ratio, $a_A/d_A$, of not more than 3, more preferably 1 to 2. The tube line can in principle be brought to the suction opening from any desired direction, e.g. from the bottom or from the side.

According to the invention, the exit openings of the gassing stirrer and of the liquid mixer or the liquid mixers are at a distance, a, from one another, the ratio, a/d, of the distance, a, to the diameter, d, of the gassing stirrer or liquid mixer being 0.02 to 0.5, more preferably 0.05 to 0.3. Furthermore, according to the invention the ratio, b/d, of the distance, b, between the outer edges to the diameter, d, of the gassing stirrer or liquid mixer is 0.01 to 0.4, more preferably 0.02 to 0.2. In the case of a stirring device having a gassing stirrer and one liquid mixer, the diameter, $d_G$, of the gassing stirrer is to be regarded as the diameter, d. If the stirring device has two liquid mixers, the diameter, d, is to be regarded as the diameter, $d_F$, of that liquid mixer which has the larger diameter.

With the distance according to the invention, the exit openings of the two stirrers lie relatively closely side by side. As long as the distance according to the invention between two adjacent exit openings exists, the exit openings can in principle be arranged relative to one another as desired. They can lie e.g. perpendicularly one above the other. However, they can also be arranged displaced with respect to one another, so that the exit openings of the one stirrer, a gassing stirrer or a liquid mixer, are before or after the exit openings of the second stirrer, the liquid mixer, in the direction of rotation of the stirring device. Furthermore, the exit openings can be displaced radially with respect to one another, for example if the diameters of the two stirrers are different. Preferably, the exit openings of the two stirrers are arranged perpendicularly to one another.

The diameter of the two stirrers can be identical or different. The diameter, $d_F$, of the liquid mixer is preferably 50 to 150%, more preferably 80 to 120% of the diameter, $d_G$, of the gassing stirrer.

Preferably, in the stirring device according to the invention, the height of the liquid mixer is 2 to 25%, more preferably 5 to 20% of the height of the gassing stirrer.

In the construction in the form of a tubular stirrer, tubes of the liquid mixer end with an angle on the side facing the flow to the tube axis of preferably 30 to 90°, more preferably 40 to 60°.

The number of blades of the gassing stirrer and liquid mixer is preferably 2 to 10, more preferably 4 to 8. The gassing stirrer and the liquid mixer or the two liquid mixers can have the same or a different number of blades. For a given number of blades, $n_G$, on the gassing stirrer, the liquid mixer preferably has a number of blades, $n_F=1$ to $n_F=2 \cdot n_G$. Particularly preferably, the number of blades, $n_G$, is the same as the number of blades, $n_F$, and in the case of two liquid mixers preferably both have the same number of blades, $n_F$.

The invention also provides a process for carrying out a gas-liquid reaction using the stirring device according to the invention. Examples of such gas-liquid reactions are oxidations, hydrogenations, chlorinations or biochemical reactions with the consumption of oxygen.

The power input into the stirring device according to the invention here is preferably 0.5 to 15 kW/m$^3$, more preferably 1 to 10 kW/m$^3$. The peripheral speed of the gassing stirrer is preferably 1 to 25 m/s, more preferably 5 to 20 m/s.

The conveying capacity of the liquid mixer is preferably co-ordinated to 1 to 50 times, more preferably to 2 to 20 times the volume stream of the reactant fed in.

In one embodiment, the stirring device according to the invention is employed for the hydrogenation of aromatic nitro compounds, in particular nitrobenzene and dinitrotoluene.

The advantage of the stirring device according to the invention lies in the fact that mixing in of two liquid or one liquid and one gaseous reactant is in each case carried out by their own mixer or stirrer, which is to be optimized to the specific task, the two mixers or stirrers being arranged on a shaft. Mixing in of the reactants is achieved by the stirring device according to the invention with minimal mutual influencing or interference of the mixing processes. The stirring device according to the invention allows a better micromixing and therefore a significantly reduced formation of by-products.

FIG. 1 shows a diagram of a first embodiment of a stirring device 10 comprising a gassing stirrer 12 in the form of a turbine stirrer and a liquid mixer 13 in the form of a pump impeller. The gassing stirrer 12 and the liquid mixer 13 are arranged on a hollow shaft 11, the gassing stirrer 12 being above the liquid mixer 13. The hollow shaft 11 serves as the feed 17 for a gaseous reactant 1. The gaseous reactant 1 exits from the gassing stirrer 12 via exit openings 14. The liquid reactant 2 is fed to the liquid mixer 13 via a feed 16 in the form of a tube line. The feed 16 lies in the region of a suction opening (not shown) of the liquid mixer 13. The liquid reactant 2 exits from the liquid mixer 13 via exit openings 15.

In FIG. 1, a designates the distance between an exit opening 14 of the gassing stirrer 12 and an exit opening 15 of the liquid mixer 13. This is the distance between the central points of the exit openings 14, 15 from one another. $d_G$ designates the diameter of the gassing stirrer 12, and $d_F$ designates the diameter of the liquid mixer 13. b furthermore designates the distance between the outer edges of the gassing stirrer 12 and the liquid mixer 13.

Figure 1A:
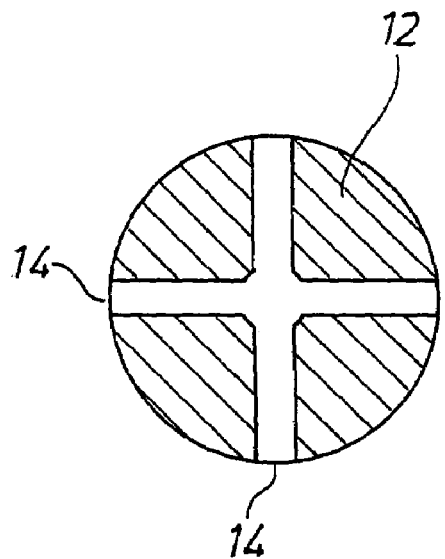
FIG. 1a shows a section through the stirring device according to FIG. 1 along line A-B.
Figure 1B:
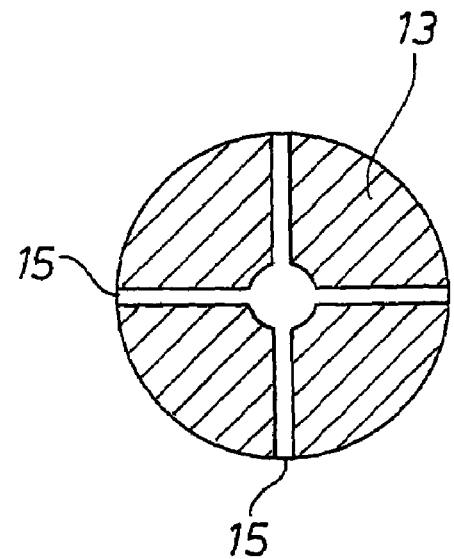
FIG. 1b shows a section through the stirring device according to FIG. 1 along line C-D.

FIG. 1a shows a section A-B through the gassing stirrer 12 of the stirring device 10 according to FIG. 1. The embodiment shown has 4 exit openings 14 for the gaseous reactants. A section C-D through the liquid mixer 13 according to FIG. 1 is shown analogously in FIG. 1b. The liquid mixer 13 also has 4 exit openings 15 for the liquid reactants. The exit openings 14, 15 of the two stirrers 12, 13 are arranged one above the other.

Figure 2:
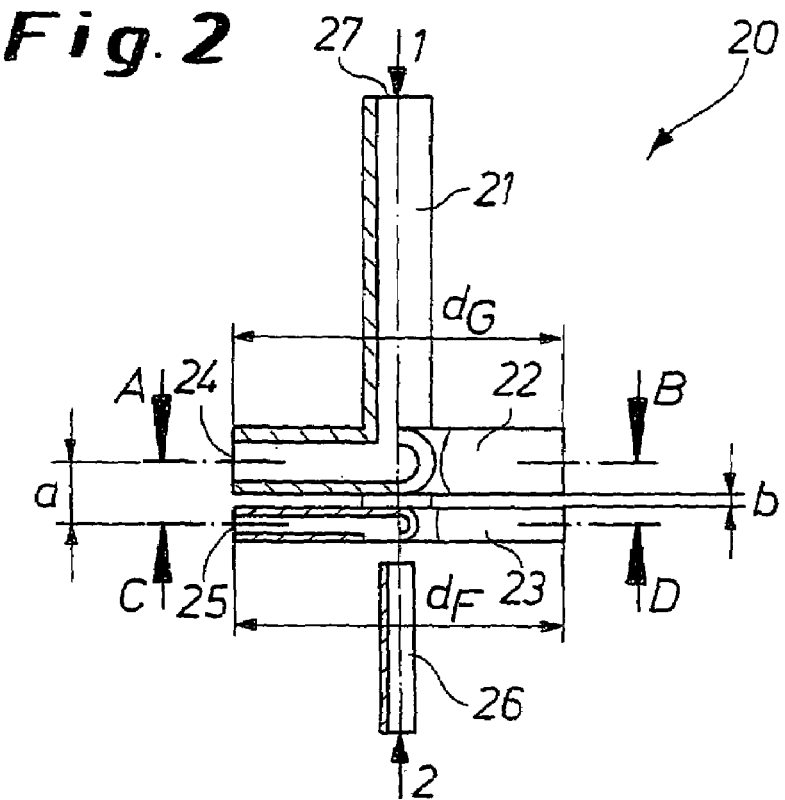
FIG. 2 shows a second embodiment of the stirring device according to the invention.

FIG. 2 shows a diagram of a second embodiment of a stirring device 20, comprising a gassing stirrer 22 and a liquid mixer 23. The gassing stirrer 22 and the liquid mixer 23 are constructed as tubular stirrers. The gassing stirrer 22 and the liquid mixer 23 are arranged on a hollow shaft 21, the gassing stirrer 22 being above the liquid mixer 23. The hollow shaft 21 serves as the feed 27 for a gaseous reactant 1. The gaseous reactant 1 exits from the gassing stirrer 22 via exit openings 24. The liquid reactant 2 is fed to the liquid mixer 23 via a feed 26 in the form of a tube line. The feed 26 lies in the region of a suction opening (not shown) of the liquid mixer 23. The liquid reactant 2 exits from the liquid mixer 23 via exit openings 25.

Figure 2A:
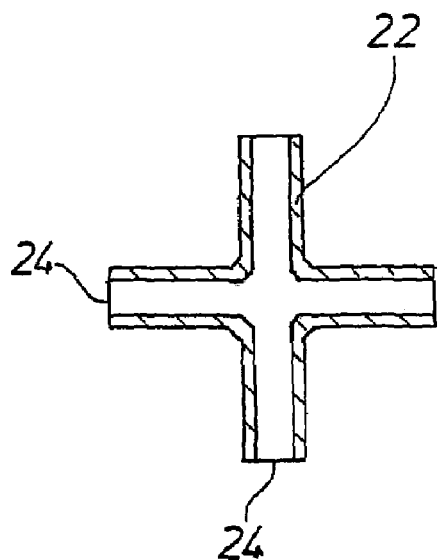
FIG. 2a shows a section through the stirring device according to FIG. 2 along line A-B.
Figure 2B:
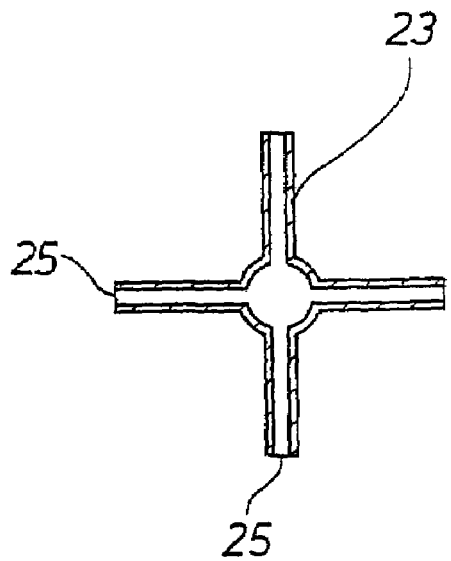
FIG. 2b shows a section through the stirring device according to FIG. 2 along line C-D.

FIG. 2a shows a section A-B through the gassing stirrer 22 of the stirring device 20 according to FIG. 2. The embodiment shown has 4 exit openings 24 for the gaseous reactants. A section C-D through the liquid mixer 23 according to FIG. 2 is shown analogously in FIG. 2b. The liquid mixer 23 also has 4 exit openings 25 for the liquid reactants. The exit openings 24, 25 of the two stirrers 22, 23 are arranged one above the other.

Figure 3:
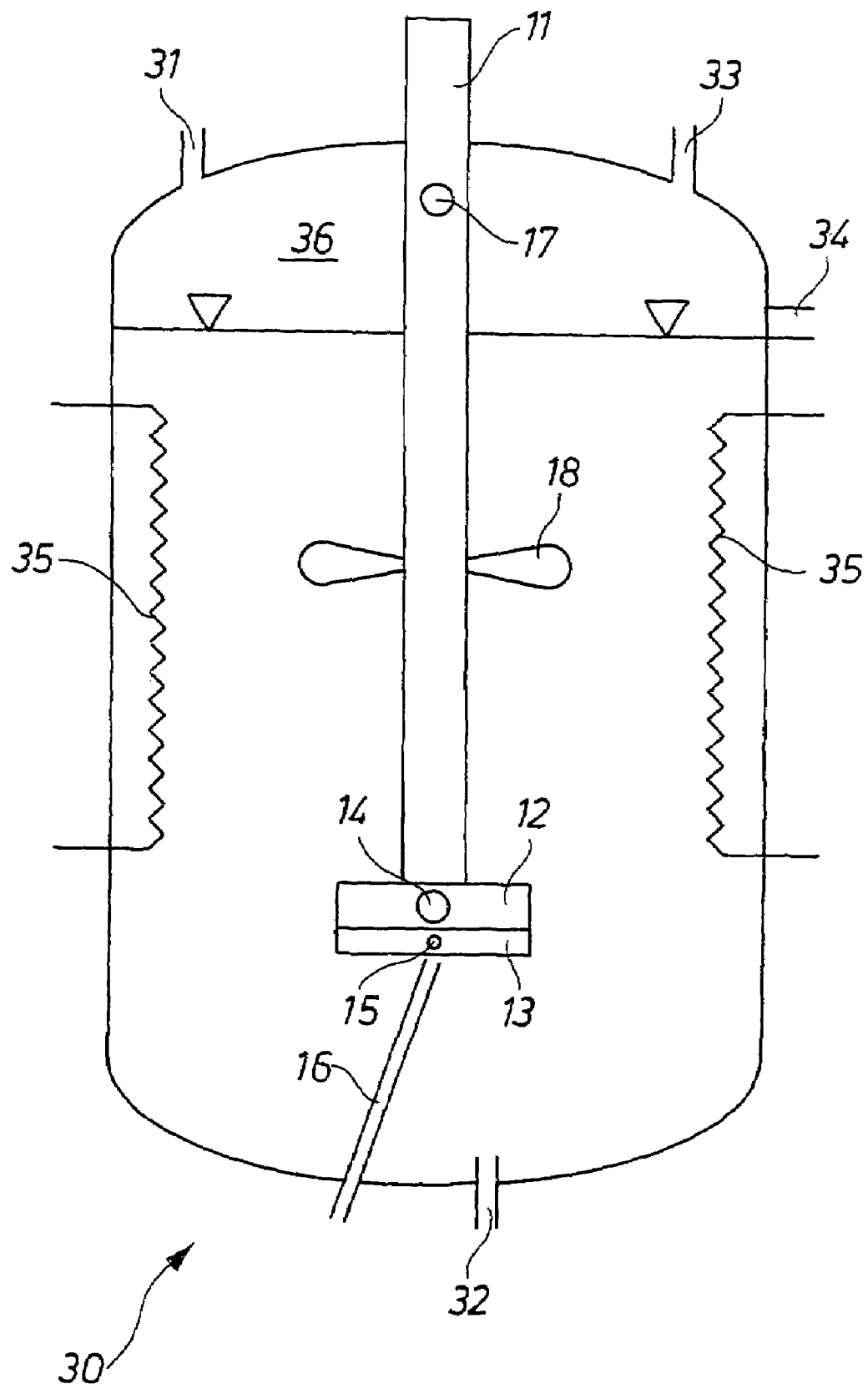
FIG. 3 shows a diagram of a reactor for carrying out the process according to the invention using a stirring device according to FIG. 1.

FIG. 3 shows a diagram of a reactor 30 for gas-liquid reactions corresponding to the process according to the invention. The reactor 30 has inlets 31, 32 for a gaseous reactant and an outlet 33 for the residual gas. The reaction product exits the reactor 30 via a product outlet 34. Heat removal devices 35 can furthermore be provided in the reactor 30. Above the gassing stirrer 12 an additional stirrer blade 18 is provided for thorough mixing of the contents of the reactor. The stirrer shaft 11 has, in the gas space 36 above the product discharge 34, a gas suction opening 17 via which gas is sucked out of the gas space 36 and circulated via the gassing stirrer 12.

The reactor 30 shown in FIG. 3 is suitable, for example, for the hydrogenation of aromatic nitro compounds, in particular nitrobenzene and dinitrotoluene. In this reaction, hydrogen is employed under a pressure of 10 to 40 bar in a reactor 30. The fresh hydrogen feed can take place via feed lines 31, 32. The hydrogen is circulated by the gassing stirrer 12. The aromatic nitro compound is fed into the liquid mixer 13 via a feed line 16 and exits the liquid mixer 13 via exit openings 15. A suitable hydrogenation catalyst, such as e.g. noble metals or nickel on support particles, such as charcoal, $SiO_2$ or $Al_2O_3$, or Raney nickel catalysts, is dispersed in the reaction mass as a solid catalyst. The crude product formed is drawn off continuously at the overflow 34, so that a constant level of liquid is maintained. The heat of reaction is removed via the heat exchanger 35. The reaction temperature is in the range from 80 to 250° C., more preferably 120 to 180° C., depending on the nature of the removal of heat and of the catalyst.

EXAMPLES

Two experiments with a model substance system were carried out in a model reactor having an internal diameter of 390 mm. The model substance system contained the three educts (starting substances) NaOH, dimethoxypropane and HCl. In a first experiment (comparison example), HCl, as described in EP 784 505 A (slurry phase reactor), was fed in via a lance installed in a fixed manner. In a second experiment (embodiment example), HCl was fed in via a liquid mixer according to the invention.

The component HCl metered in reacted very quickly (ionic reaction) with the first educt, NaOH, while the reaction with the second educt, dimethoxypropane, took place only in the zones which were already depleted in the first educt, NaOH, due to poor mixing. The amount of product formed in the second reaction was a measure of the quality of the mixing. The model substance system is representative of many chemical reactions with formation of by-products or secondary products.

The gassing stirrer was identical in the two experiments. It was connected to the gas space above the level of fill via a hollow shaft. The diameter of the gassing stirrer (6×60° angled blade stirrer) was 100 mm and the height was 25 mm.

In the comparison examples, a tube 6×1 mm was chosen as the lance installed in a fixed manner. The opening of the lance was installed 5 mm above the outer edge of the gassing stirrer.

The liquid mixer constructed as a tubular stirrer employed in the experiments carried out according to the invention (embodiment example) also had a diameter of 100 mm, and the height was 3.2 mm (tube 3.2×0.6 mm) at an internal distance of 5 mm from the lower edge of the gassing stirrer. The number of blades of the gassing stirrer and the number of tubes of the liquid mixer was 6, with a tangential angle of 0° being established between the edges. The exit openings of the liquid mixer were angled against the direction of flow (direction of rotation of the stirrer) by 45° to the tube axis.

The distance a between the exit openings was 5 mm, with a diameter, $d_G$, of the gassing stirrer of 100 mm.

The speed of rotation of the stirring device was varied from 600 to 1,400 rpm. The conveying of air via the gassing stirrer started at approx. 800 rpm. The power input was 0.5 to 4 kW/m$^3$. The peripheral speed was 3 to 8 m/s.

NaOH was initially introduced into the experiment container (diameter 390 mm) as a 0.105 molar and dimethoxypropane as a 0.1 molar aqueous solution. HCl was added as an 8 molar solution until the excess of NaOH was only 5 mol %. In both experiments the metering rate was chosen such that a metering time of approx. 6 minutes resulted, because at metering times of 2 to 10 minutes, under otherwise identical conditions, no influencing at all of the mixing result was observed.

In the comparison example with the lance installed in a fixed manner, according to EP 784 505 A, the lance was installed 5 mm above the outer edge on the outside edge of the gassing stirrer. In the comparison example, acetone weight contents of approx. 2.2 g/kg were measured, regardless of the speed of rotation.

In the inventive example, the HCl was added via the co-rotating liquid mixer under otherwise identical conditions. At speeds of rotation up to 800 rpm, acetone weight contents of approx. 1.9 g/kg were detected, while at higher speeds of rotation this value dropped significantly, and at 1,200 rpm was only 1.43 g/kg.

In the model system investigated, under otherwise identical conditions, it was surprisingly thus possible to lower the concentration of the reaction product formed in the second reaction by 65% by changing the metering in of the acid in the context of the invention, compared with metering in according to the prior art with a fixed feed tube (lance) at the outer diameter 5 mm above the upper edge of the gassing stirrer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stirring device comprising a gassing stirrer having at least one exit opening and a liquid mixer or two liquid mixers having at least one exit opening, arranged on a shaft having a feed, wherein the at least one exit opening of the stirrer and the at least one opening of the mixer or of the mixers are at a distance from one another, such that a ratio, a/d, of distance, a, between the exit openings to diameter, d, of the stirrer and mixer or the mixers is from about 0.02 to about 0.5 and a ratio, b/d, of distance, b, between an edge of the stirrer and an edge of the mixer to diameter, d, of the stirrer or the mixer is from about 0.01 to about 0.4 and wherein the height of the liquid mixer is about 2 to about 25% of the height of the gassing stirrer.

2. The stirring device according to claim 1, wherein the shaft is constructed as a hollow shaft and isprovided as the feed for the gassing stirrer, wherein the liquid mixer has a suction opening and wherein a tube line which is arranged in the region of the suction opening is provided as the feed for the liquid mixer.

3. The stirring device according to claim 1, wherein diameter, $d_F$, of the liquid mixer is about 50 to about 150% of the diameter, $d_G$, of the gassing stirrer.

4. The stirring device according to claim 1, wherein diameter, $d_F$, of the liquid mixer is about 80 to about 120% of diameter, $d_G$, of the gassing stirrer.

5. The stirring device according to claim 1, wherein the stirring device further includes from 2 to 10 blades affixed to the shaft.

6. The stirring device according to claim 1, wherein the stirring device further includes from 4 to 8 blades affixed to the shaft.

7. The stirring device according to claim 1, wherein the gassing stirrer is a tubular stirrer or turbine stirrer.

8. The stirring device according to claim 1, wherein the liquid mixer is a hollow stirrer.

9. The stirring device according to claim 8, wherein the hollow stirrer is a tubular stirrer or a pump impeller.

10. A stirring device comprising a gassing stirrer having at least one exit opening and a liquid mixer or two liquid mixers having at least one exit opening, arranged on a shaft having a feed, wherein the at least one exit opening of the stirrer and the at least one opening of the mixer or of the mixers are at a distance from one another, such that a ratio, a/d, of distance, a, between the exit openings to diameter, d, of the stirrer and mixer or the mixers is from about 0.02 to about 0.5 and a ratio, b/d, of distance, b, between an edge of the stirrer and an edge of the mixer to diameter, d, of the stirrer or the mixer is from about 0.01 to about 0.4 and wherein the height of the Liquid mixer is about 5 to about 20% of the height of the gassing stirrer.

11. The stirring device according to claim 10, wherein the shaft is constructed as a hollow shaft and is provided as the feed for the gassing stirrer, wherein the liquid mixer has a suction opening and wherein a tube line which is arranged in the region of the suction opening is provided as the feed for the liquid mixer.

12. The stirring device according to claim 10, wherein diameter, $d_F$, of the liquid mixer is about 50 to about 150% of the diameter, $d_G$, of the gassing stirrer.

13. The stirring device according to claim 10, wherein diameter, $d_F$, of the liquid mixer is about 80 to about 120% of diameter, $d_G$, of the gassing stirrer.

14. The stirring device according to claim 10, wherein the stirring device further includes from 2 to 10 blades affixed to the shaft.

15. The stirring device according to claim 10, wherein the stirring device further includes from 4 to 8 blades affixed to the shaft.

16. The stirring device according to claim 10, wherein the gassing stirrer is a tubular stirrer or turbine stirrer.

17. The stirring device according to claim 10, wherein the liquid mixer is a hollow stirrer.

18. The stirring device according to claim 17, wherein the hollow stirrer is a tubular stirrer or a pump impeller.

* * * * *